UNITED STATES PATENT OFFICE.

WILLIAM BEECROFT BOTTOMLEY, OF LONDON, ENGLAND.

TREATMENT OF PEAT FOR MANURIAL AND OTHER PURPOSES.

1,106,275. Specification of Letters Patent. Patented Aug. 4, 1914.

No Drawing. Application filed July 15, 1913. Serial No. 779,168.

*To all whom it may concern:*

Be it known that I, WILLIAM BEECROFT BOTTOMLEY, a subject of the King of Great Britain, residing in London, England, and whose post-office address is King's College, in the county of London, England, have invented a certain new and useful Improved Treatment of Peat for Manurial and other Purposes, of which the following is a specification.

According to this invention peat can be converted into an excellent manure by treating it with micro-organisms capable of producing ammonia. Such micro-organisms are obtainable by known methods from ordinary soil or from other sources such as putrefying bouillon. There are several species of them, such as *Bacillus mycoides*, *Bacillus subtilis*, *Bacterium aerogens* and *Bacterium fluorescens liquefaciens*. It is not essential to use a pure culture of any particular species or of the mixed species, since other micro-organisms may be present. The effect of these micro-organisms on the peat is to convert the humic acid and humous bodies contained in it into compounds soluble in water and at the same time to disintegrate the peat so that it is readily distributed.

A product richer in nitrogen is obtained if nitrogen fixing organisms such as *Azotobacter* and *Bacillus radicicola* are present in the mass.

In addition to its usefulness as a manure the product forms a ready source of the substances commonly classed as humic acid or humous bodies, which have lately found application in industry.

There is no difficulty in obtaining a culture of micro-organisms, containing no doubt very many species, suitable for my invention. For this purpose 10–20 grams of fertile soil may be added to a culture medium comprising 1 liter of water, 20 grams of dextrin, 1 gram of dipotassium phosphate, ½ gram of magnesium sulfate, 2 grams of calcium carbonate and 10 cc. of bouillon. The scum which forms on the surface of the liquid in the course of a few days is suitable for my invention. Pure culture consisting of any of the individual species that are active for the purpose or mixed cultures may of course be prepared, but this is not necessary so far as is at present known to me.

To the peat or peat material is added water containing the organisms and the mass is allowed to undergo the change involved, for some days. When the peat has been dried, as is the case with certain prepared peat, the amount of water added should suffice to moisten the mass thoroughly. It is not, however, necessary to dry the peat, for if this is in its natural wet condition it may be merely sprinkled with the water containing the mirco-organisms.

The process is preferably hastened by adding to the mass a nitrogenous organic material, particularly a weak solution of a soluble nitrogenous organic material, such as albumin, gelatin or meat extract; a solution containing say 0.25–0.5 per cent., of any standard meat extract, for example will serve. Such a solution may constitute the liquid in which the micro-organisms may be contained as aforesaid. I have found that a very suitable nitrogenous extract consists of the waste liquor obtained from the boiling of bones. It is also desirable to add a small proportion of a carbohydrate such as sugar or starch; say about 0.1 per cent. of the dry weight of the original peat, dissolved or suspended in a little water.

The saturated peat may be left at a temperature of 24–30° C. for three weeks or thereabout and may then be dried. In this condition it may be applied directly as a manure. Or before it is dried it may be sterilized, such as by live steam, and then further treated with nitrogen-fixing organisms for increasing the amount of nitrogen in the mass, these organisms being capable of growing in the altered peat.

If soluble humous substances be required the treated mass may be leached with water and the solution used directly for any of the purposes to which humus is applied; or an acid may be added to precipitate the humic acid from the aqueous solution. The aqueous extract of the treated peat is also useful as a liquid manure.

Having thus described the nature of my said invention and the best means I know of carrying the same into practical effect, I claim:—

1. A process of treating peat which consists in adding to the moist peat aërobic micro-organisms capable of producing ammonia and allowing these micro-organisms to multiply in the peat.

2. A process of treating peat which consists in adding to the moist peat aërobic micro-organisms capable of producing ammonia and nitrogen-fixing micro-organisms and allowing the said micro-organisms to multiply in the peat.

3. A process of treating peat which consists in adding to the peat water containing ammonia-fixing micro-organisms and drying the material after some days.

4. A process of treating peat which consists in adding to the peat water containing ammonia-fixing micro-organisms and nitrogen-fixing micro-organisms and drying the material after some days.

5. A process of treating peat which consists in adding to the peat water containing ammonia-fixing micro-organisms, then sterilizing the material and adding to it nitrogen-fixing micro-organisms.

6. A process of treating peat which consists in adding to the peat nitrogenous material adapted to be converted in part into ammonia, then adding to the moist peat ammonia-producing micro-organisms and drying the material after some days.

7. As a new product peat which has been subjected to the action of ammonia-producing micro-organisms and contains soluble humates.

In testimony whereof I have signed my name to this specification in the presence of two subscribing witnesses.

WILLIAM BEECROFT BOTTOMLEY.

Witnesses:
  JOSEPH MILLARD,
  GEO. J. M. FRANKLIN.